United States Patent
Ozawa et al.

(10) Patent No.: US 8,708,235 B2
(45) Date of Patent: Apr. 29, 2014

(54) CARD READER

(75) Inventors: Shigeki Ozawa, Nagano (JP); Yukihiko Takita, Nagano (JP); Kazutoshi Ishikawa, Nagano (JP); Kazunori Takahashi, Nagano (JP)

(73) Assignee: Nidec Sankyo Corporation (JP)

(*) Notice: Subject to any disclaimer, the term of this patent is extended or adjusted under 35 U.S.C. 154(b) by 0 days.

(21) Appl. No.: 13/575,672

(22) PCT Filed: Jan. 26, 2011

(86) PCT No.: PCT/JP2011/051498
§ 371 (c)(1),
(2), (4) Date: Jul. 27, 2012

(87) PCT Pub. No.: WO2011/093340
PCT Pub. Date: Aug. 4, 2011

(65) Prior Publication Data
US 2013/0299582 A1  Nov. 14, 2013

(30) Foreign Application Priority Data

Jan. 27, 2010 (JP) ................. 2010-015404
Jan. 27, 2010 (JP) ................. 2010-015405

(51) Int. Cl.
*G06K 7/00* (2006.01)
(52) U.S. Cl.
USPC ............ 235/440; 235/380; 235/492; 235/487
(58) Field of Classification Search
USPC ................. 235/440, 380, 492, 487, 375, 439; 902/8–14
See application file for complete search history.

(56) References Cited

U.S. PATENT DOCUMENTS

| 6,422,475 B1* | 7/2002 | May ............................ 235/492 |
| 2007/0131768 A1* | 6/2007 | Wakabayashi ............... 235/449 |
| 2009/0117846 A1* | 5/2009 | Mavrakakis ................ 455/3.06 |
| 2009/0159676 A1* | 6/2009 | Schliebe et al. ............. 235/436 |

FOREIGN PATENT DOCUMENTS

| JP | 2001-22894 A | 1/2001 |
| JP | 2001-67525 A | 3/2001 |
| JP | 2004-70476 A | 3/2004 |
| JP | 2005-62938 A | 3/2005 |
| JP | 3806271 B2 | 8/2006 |
| JP | 3850595 B2 | 11/2006 |

(Continued)

OTHER PUBLICATIONS

International Search Report for International application No. PCT/JP2011/051498 mailing date of Mar. 29, 2011 with English translation.

*Primary Examiner* — Edwyn Labaze
(74) *Attorney, Agent, or Firm* — Cantor Colburn LLP

(57) ABSTRACT

Disclosed is a card reader which has a comparatively simple construction and is capable of appropriately detecting whether or not a magnetic head for skimming has been attached thereto. A card reader is provided with: a magnetic head which reads magnetic data recorded on a card and/or records magnetic data onto a card; a card insertion unit which has an insertion opening into which a card is inserted formed therein; and a metal sensor (which detects that a foreign body containing metal material has been attached to the front surface side of the card insertion unit. The metal sensor is arranged in substantially the same position as the arrangement position of the magnetic head, in the width direction of the card.

18 Claims, 6 Drawing Sheets

(56) References Cited

FOREIGN PATENT DOCUMENTS

| JP | 2007-164533 A | 6/2007 |
| JP | 2008-191916 A | 8/2008 |
| JP | 2008-225670 A | 9/2008 |

\* cited by examiner

CARD READER

CROSS REFERENCE TO RELATED APPLICATIONS

This is a U.S. national stage of International Application No. PCT/JP2011/051498, filed on Jan. 26, 2011. Priority under 35 U.S.C. §119(a) and 35 U.S.C. §365(b) is claimed from Japanese Applications Nos. 2010-015404, filed Jan. 27, 2010; and 2010015405, filed Jan. 27, 2010, the disclosures of which are also incorporated herein by reference.

TECHNICAL FIELD

The present invention relates to a card reader which performs at least one of reading of magnetic data recorded on a card and recording of magnetic data to a card.

BACKGROUND

Conventionally, a card reader has been widely used which performs reading of magnetic data recorded on a card and recording of magnetic data to a card. The card reader is, for example, mounted on a host device such as an ATM (Automate Teller Machine) which is installed and used in a financial institution such as a bank. Further, in the financial institutions in which the card reader is used, conventionally, a so-called skimming which means that a criminal attaches a magnetic head to a card insertion part of a card reader to illegally obtain magnetic data of a card by the magnetic head has been a serious problem.

In order to prevent this problem, a skimming device detection system has been proposed for detecting attachment of a skimming device including a magnetic head for skimming (hereinafter, referred to as a "skimming magnetic head") to a card insertion part of an ATM (see, for example, Patent Literature 1). A skimming device detection system described in Patent Literature 1 includes an imaging device on which a lens having an autofocus control function is mounted. In the skimming device detection system, a transaction operation part of an ATM is image-pickuped by the imaging device to detect whether a skimming device is attached to a card insertion part or not on the basis of an image which is obtained by the imaging device.

[PTL 1] Japanese Patent Laid-Open No. 2008-225670

When the skimming device detection system described in Patent Literature 1 is used, it is possible to detect whether a skimming device is attached to a card insertion part or not. However, the skimming device detection system described in Patent Literature 1 is provided with the imaging device on which a lens having an autofocus control function is mounted and thus its structure is complicated.

Further, when the skimming device detection system described in Patent Literature 1 is used, an illegal act of a criminal is prevented. However, when the skimming device detection system is used for preventing an illegal act of a criminal, the skimming device detection system is required to be used together with the ATM. In other words, when this skimming device detection system is used, a large-scale apparatus is required.

SUMMARY

In view of the problem described above, at least an embodiment of the present invention provides a card reader with a relatively simple structure which is capable of appropriately detecting whether a skimming magnetic head is attached or not.

Further, at least an embodiment of the present invention provides a card reader with a relatively simple structure which is capable of preventing an illegal act of a criminal.

In order to attain the above, at least an embodiment of the present invention provides a card reader including a magnetic head which performs at least one of reading of magnetic data recorded on a card and recording of magnetic data to the card, a card insertion part which is formed with an insertion port into which the card is inserted, and a metal sensor for detecting attachment of a foreign matter including metal material to a front face side of the card insertion part. The metal sensor is disposed at substantially the same position as an arrangement position of the magnetic head in a widthwise direction of the card which is substantially perpendicular to an inserting direction of the card.

The card reader in accordance with at least an embodiment of the present invention includes a metal sensor for detecting attachment of a foreign matter including metal material to a front face side of the card insertion part, and the metal sensor is disposed at substantially the same position as an arrangement position of the magnetic head in a widthwise direction of the card which is substantially perpendicular to an inserting direction of the card. A skimming magnetic head is attached so as to correspond to the arrangement position of the magnetic head of the card reader in a widthwise direction of the card. Therefore, in at least an embodiment of the present invention, it is appropriately detected by the metal sensor whether a skimming magnetic head is attached or not. In other words, in at least an embodiment of the present invention, even when a complicated device such as a skimming device detection system described in Patent Literature 1 is not used, it is appropriately detected whether a skimming magnetic head is attached or not with a relatively simple structure with the use of the metal sensor which is mounted as a structural component of the card reader.

In at least an embodiment of the present invention, it is preferable that the card reader includes a card passage where the card is passed and the card insertion part is formed with a protruded part which is protruded toward a front side of the card insertion part and, when viewed in an inserting direction of the card, the protruded part and the magnetic head are disposed so as to interpose the card passage therebetween, and the metal sensor is disposed in an inside of the protruded part. A skimming magnetic head is attached to the front face side of the card insertion part so as to be superposed on the magnetic head of card reader when viewed in an inserting direction of a card. Therefore, according to the above-mentioned structure, it is further appropriately detected by the metal sensor whether a skimming magnetic head is attached or not. Further, according to the structure, since the metal sensor is disposed in an inside of the protruded part, a criminal is hard to notice that the metal sensor is mounted. Further, the metal sensor is easily prevented from being damaged by a criminal.

In at least an embodiment of the present invention, it is preferable that the card reader includes a card passage where the card is passed and, when viewed in an inserting direction of the card, the magnetic head and the metal sensor are disposed so as to interpose the card passage therebetween, and the metal sensor is disposed so that its detecting direction is inclined with respect to a thickness direction of the card that is substantially perpendicular to the inserting direction of the card and the widthwise direction of the card, and so that its detectable region is widened toward a front side of the card insertion part. A skimming magnetic head is attached to the front face side of the card insertion part so as to be superposed on the magnetic head of the card reader when viewed in an inserting direction of a card. Therefore, according to the above-mentioned structure, it is further appropriately detected by the metal sensor whether the skimming magnetic head is attached or not.

In at least an embodiment of the present invention, it is preferable that the metal sensor comprises a core which is formed of magnetic material, and a pair of excitation coils and a detection coil which are wound around with a center axis of the core as a center, the core is provided with a center core part which is disposed at a substantially center in an axial direction of the center axis and a pair of axial end core parts which are disposed on both end sides of the center core part in the axial direction of the center axis, and the detection coil is wound around the center core part and each of the pair of the excitation coils is wound around each of the pair of the axial end core parts. According to this structure, a foreign matter including metal material is detected with a high degree of sensitivity and is stably detected while effect of surrounding temperature variation is restrained.

In at least an embodiment of the present invention, it is preferable that at least one coil of the pair of the excitation coils and the detection coil is excited so that a disturbing noise is generated for disturbing reading of magnetic data on the card by a skimming magnetic head which is the foreign matter attached to the front face side of the card insertion part. According to this structure, when a skimming magnetic head is attached to the front face side of the card insertion part, the metal sensor generates a disturbing noise. Therefore, reading of magnetic data on a card by a skimming magnetic head is prevented by a noise generated by the metal sensor. In other words, skimming is prevented by a noise which is generated by the metal sensor.

In at least an embodiment of the present invention, it is preferable that the card reader includes a card passage where the card is passed and a card insertion prevention member which is capable of closing the card passage to prevent insertion of the card and, when the metal sensor detects the foreign matter, the card insertion prevention member maintains a state that the card passage is closed, or the card insertion prevention member closes the card passage having been opened. According to this structure, when a skimming magnetic head is attached to the card insertion part, since the card passage is closed by the card insertion prevention member, a user is unable to insert a card. Therefore, skimming is prevented.

In at least an embodiment of the present invention, it is preferable that the card reader includes an infrared sensor for detecting a human body which is disposed on the front face side of the card insertion part for detecting movement of a person on a front side with respect to the card reader. According to this structure, even in a case that the metal sensor is unable to detect the skimming magnetic head because a certain artifice is made on the skimming magnetic head, when the skimming device having a skimming magnetic head is attached to the front face side of the card insertion part, the infrared sensor is hard to detect movement of a person in front of the card reader. Therefore, for example, in a case that, although the infrared sensor does not detect movement of a person, a card is inserted into the card reader, it may be judged that a skimming device is attached to the card insertion part and thus it may be operated that the succeeding transaction in the card reader is stopped. Further, when the succeeding transaction in the card reader is stopped, for example, a personal identification number of a card is prevented from being acquired by a criminal. Further, for example, it is preferable that the card reader is structured so that, when the infrared sensor detects movement of a person, a card is capable of being inserted by a user. In this case, when a skimming device is attached to the card insertion part and the infrared sensor does not detect movement of a person in front of the card reader, a user cannot insert a card and thus skimming itself is prevented.

In at least an embodiment of the present invention, it is preferable that the card reader includes a card passage where the card is passed and, when viewed in the inserting direction of the card, the metal sensor and the infrared sensor are disposed so as to interpose the card passage therebetween. Further, in at least an embodiment of the present invention, it is preferable that at least a part of a detectable region of the metal sensor and at least a part of a detectable region of the infrared sensor are overlapped with each other. According to this structure, a detectable region of the infrared sensor and a detectable region of the metal sensor are set in a portion where a skimming magnetic head is easy to be attached. Therefore, even in a case that a skimming device having a skimming magnetic head is relatively small, when the skimming device is attached, the infrared sensor is hard to detect movement of a person and the metal sensor is easy to detect the skimming device. As a result, an illegal act of a criminal is prevented further effectively by the infrared sensor and the metal sensor.

Further, in order to attain above, at least an embodiment of the present invention provides a card reader including a magnetic head which performs reading of magnetic data recorded on a card and/or recording of magnetic data to the card, a card insertion part which is formed with an insertion port into which the card is inserted, and an infrared sensor for detecting a human body which is disposed on a front face side of the card insertion part for detecting movement of a person in front of the card reader.

The card reader according to at least an embodiment of the present invention includes an infrared sensor for detecting a human body which is disposed on a front face side of the card insertion part for detecting movement of a person in front of the card reader. Therefore, when a skimming device having a skimming magnetic head is attached to the front face side of the card insertion part, the infrared sensor is hard to detect movement of a person in front of the card reader. Accordingly, for example, although the infrared sensor does not detect movement of a person, when a card is inserted into the card reader, it may be judged that a skimming device is attached to the card insertion part and thus it may be operated that the succeeding transaction in the card reader is stopped. Further, when the succeeding transaction in the card reader is stopped, for example, a personal identification number of a card is prevented from being acquired by a criminal. Further, for example, when the card reader is structured so that, when the infrared sensor detects movement of a person, a card is capable of being inserted by a user, in a case that a skimming device is attached to the card insertion part and the infrared sensor does not detect movement of a person in front of the card reader, a user cannot insert a card and thus skimming itself is prevented.

As described above, in at least an embodiment of the present invention, even when a complicated device such as a skimming device detection system described in Patent Literature 1 is not used, skimming itself is prevented or illegal acquisition of a personal identification number of a card by a criminal is prevented with a relatively simple structure with the use of the infrared sensor which is mounted as a structural component of the card reader. In other words, in at least an embodiment of the present invention, an illegal act of a criminal is prevented with a relatively simple structure with the use of the infrared sensor.

In at least an embodiment of the present invention, it is preferable that the infrared sensor is disposed in a vicinity of the insertion port. A skimming magnetic head is usually attached in the vicinity of the insertion port and thus, according to this structure, when a skimming device is attached to the front face side of the card insertion part, the light receiving part of the infrared sensor is easy to be intercepted by the skimming device. In other words, according to this structure, when a skimming device is attached to the front face side of the card insertion part, the infrared sensor is further hard to detect movement of a person in front of the card reader. Therefore, an illegal act of a criminal is prevented effectively.

In at least an embodiment of the present invention, it is preferable that the infrared sensor is disposed at substantially the same position as an arrangement position of the magnetic head in a widthwise direction of the card which is substantially perpendicular to an inserting direction of the card. Further, in at least an embodiment of the present invention, it is preferable that the card reader includes a card passage where the card is passed, and the magnetic head is disposed so that its gap part faces the card passage, and the infrared sensor is disposed on a side where the magnetic head is disposed with respect to the card passage in a thickness direction of the card which is substantially perpendicular to an inserting direction of the card and which is substantially perpendicular to a widthwise direction of the card that is substantially perpendicular to the inserting direction of the card. A skimming magnetic head is attached at a position corresponding to an arrangement position of the magnetic head of the card reader in the widthwise direction of a card and in the thickness direction of the card. Therefore, according to the structure, when a skimming device is attached to the card insertion part, the light receiving part of the infrared sensor is intercepted by the skimming magnetic head with a high degree of possibility. In other words, according to the structure, when a skimming device is attached to the card insertion part, the infrared sensor does not detect movement of a person in front of the card reader with a high degree of possibility. Therefore, an illegal act of a criminal is prevented further effectively.

In at least an embodiment of the present invention, it is preferable that the card reader includes a card passage where the card is passed and a card insertion prevention member which is capable of closing the card passage to prevent insertion of the card, and the card insertion prevention member closes the card passage at a standby time when the card is not inserted into the card reader and, when the infrared sensor detects movement of a person, the card insertion prevention member opens the card passage to permit insertion of the card. According to this structure, in a case that a skimming device is attached to the card insertion part and, when the infrared sensor does not detect movement of a person, the card insertion prevention member closes the card passage and a user cannot insert a card. Therefore, skimming itself is prevented.

In at least an embodiment of the present invention, it is preferable that the card reader includes a card passage where the card is passed and a card sensor for detecting presence/absence of the card in the card passage and, when the card sensor detects the card in a state that the infrared sensor does not detect movement of a person, an abnormal signal is transmitted to a host device on which the card reader is mounted. In a case that, although the infrared sensor does not detect movement of a person, the card sensor detects a card, it may be judged that a skimming magnetic head is attached to the card insertion part. Therefore, according to the structure, the succeeding transaction in the card reader can be stopped according to a control command from its host device. As a result, for example, a personal identification number of a card is prevented from being acquired by a criminal.

In at least an embodiment of the present invention, it is preferable that the card reader includes a metal sensor which is disposed on a front face side of the card insertion part for detecting attachment of a foreign matter including metal material to a front face side of the card insertion part. In an infrared sensor, even when a skimming device is attached to the card insertion port, the infrared sensor is unable to distinguish whether a skimming device is attached to the card insertion port or whether no person is existed in front of the card reader. In other words, when a skimming device is attached to the card insertion port, the infrared sensor cannot detect attachment of the skimming device. However, according to the above-mentioned structure, when a skimming device is attached to the card insertion port, attachment of the skimming device is detected by the metal sensor. Therefore, when a predetermined processing is performed on the basis of a detected result by the metal sensor, an illegal act of a criminal is prevented effectively.

In at least an embodiment of the present invention, it is preferable that the metal sensor includes a core which is formed of magnetic material and a pair of excitation coils and a detection coil which are wound around with a center axis of the core as a center, and the core is provided with a center core part which is disposed at a substantially center in an axial direction of the center axis and a pair of axial end core parts which are disposed on both end sides of the center core part in the axial direction of the center axis, and the detection coil is wound around the center core part and each of the pair of the excitation coils is wound around each of the pair of the axial end core parts, and at least one coil of the pair of the excitation coils and the detection coil is excited so that, when the infrared sensor does not detect movement of a person, a disturbing noise is generated for disturbing reading of magnetic data on the card by a skimming magnetic head which is the foreign matter attached to the front face side of the card insertion part, and so that the disturbing noise is stopped when the infrared sensor detects movement of a person. According to this structure, in a case that a skimming device is attached to the front face side of the card insertion part and thus, when the infrared sensor is unable to detect movement of a person, the metal sensor generates a disturbing noise. Therefore, reading of magnetic data of a card by a skimming magnetic head is prevented by a noise which is generated by the metal sensor.

In at least an embodiment of the present invention, it is preferable that at least a part of a detectable region of the infrared sensor and at least a part of a detectable region of the metal sensor are overlapped with each other. According to this structure, a detectable region of the infrared sensor and a detectable region of the metal sensor can be set in a portion where a skimming magnetic head is easy to be attached. Therefore, even in a case that a skimming device having a skimming magnetic head is relatively small, when the skimming device is attached, the infrared sensor is hard to detect movement of a person and the metal sensor is easy to detect the skimming device. As a result, an illegal act of a criminal is prevented further effectively by the infrared sensor and the metal sensor.

As described above, in the card reader in accordance with at least an embodiment of the present invention, it is appropriately detected whether a skimming magnetic head is attached or not with a relatively simple structure with the use of the metal sensor which is mounted as a structural component of the card reader.

Further, in the card reader in accordance with at least an embodiment of present invention, an illegal act of a criminal is prevented with a relatively simple structure with the use of the infrared sensor which is mounted as a structural component of the card reader.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention will be described below with reference to the accompanying drawings.
(Schematic Structure of Card Reader)

Figure 1:
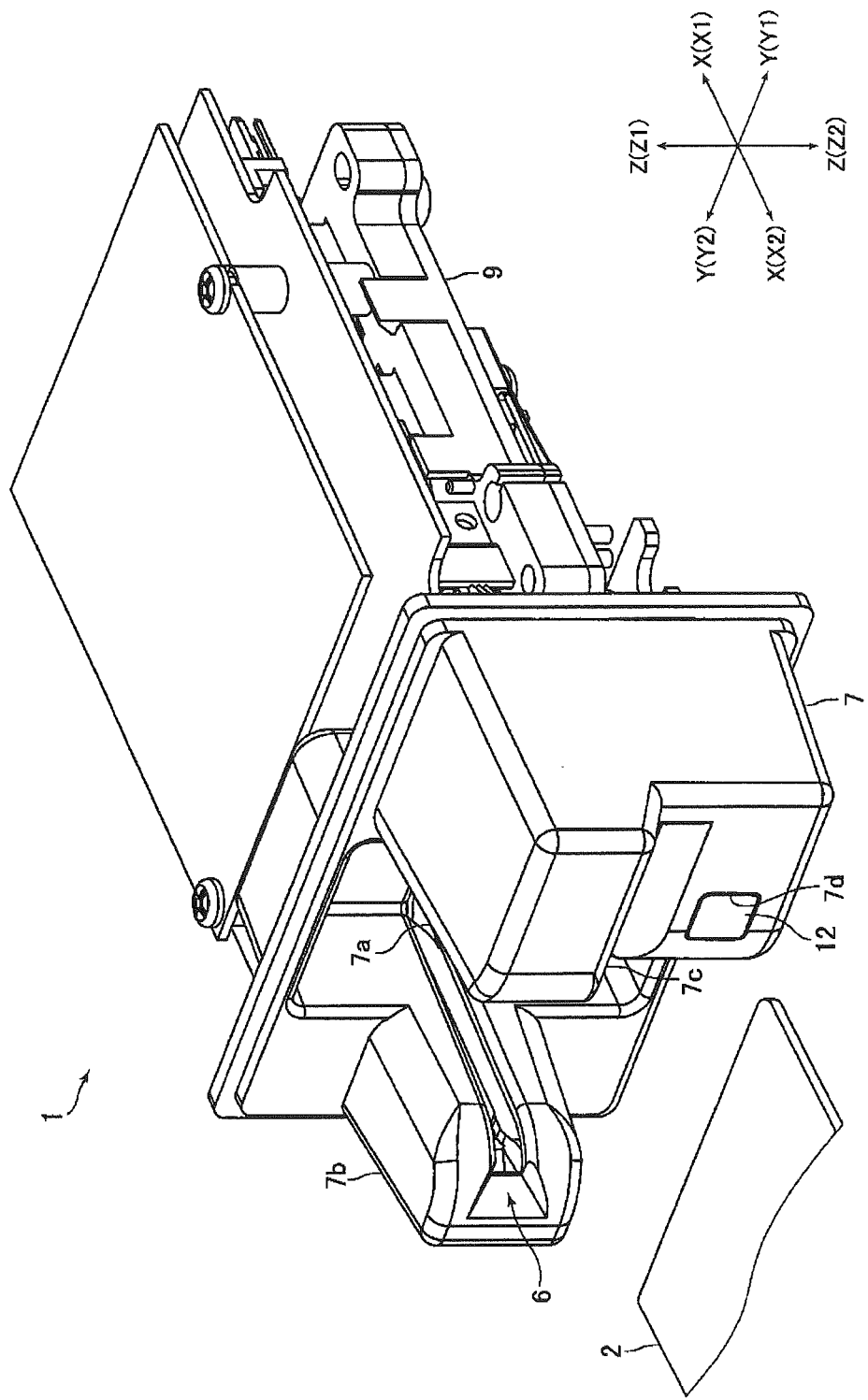
FIG. 1 is a perspective view showing a card reader in accordance with an embodiment of the present invention.
Figure 2:
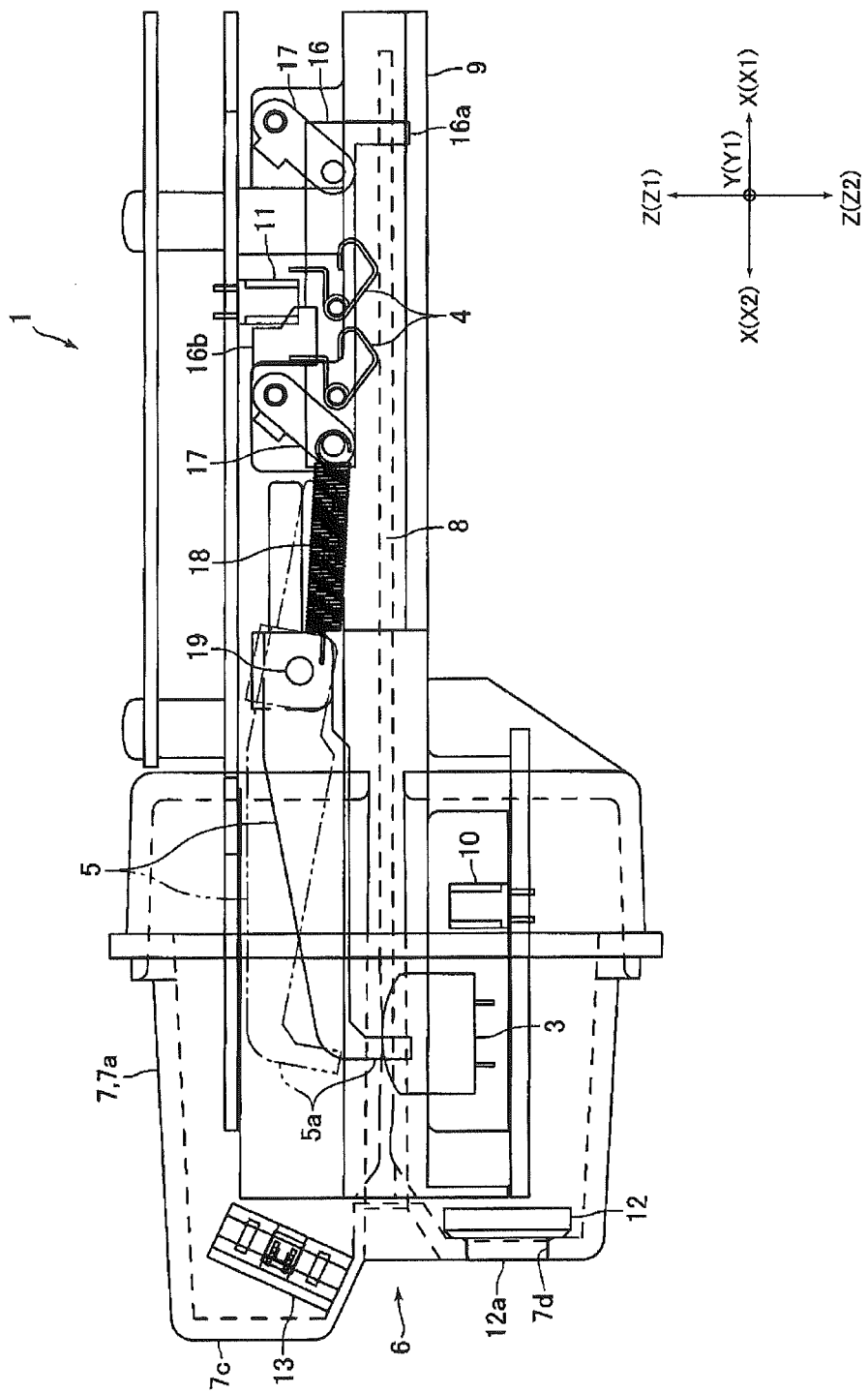
FIG. 2 is an explanatory side view showing a schematic structure of the card reader shown in FIG. 1.
Figure 3:
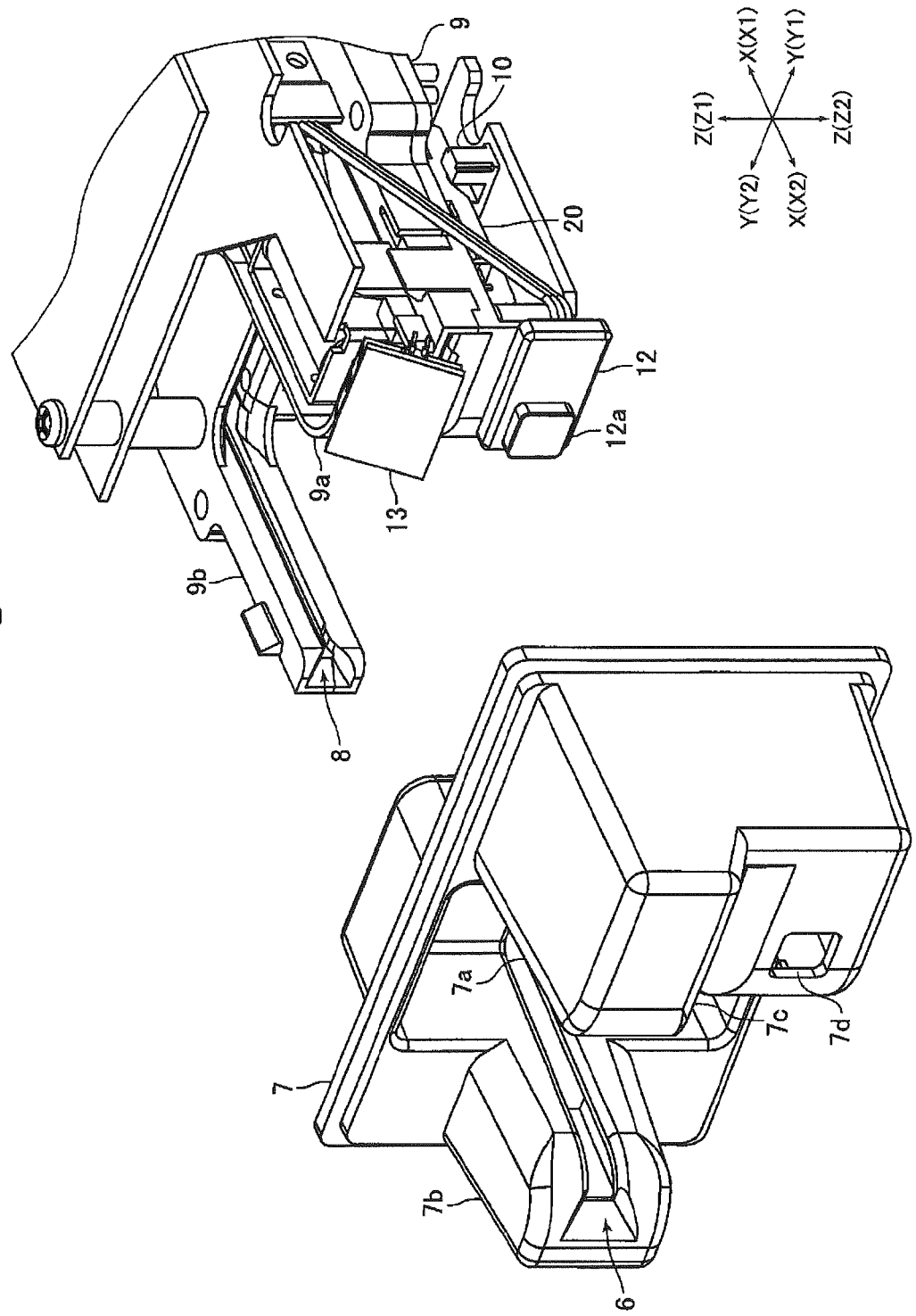
FIG. 3 is an explanatory exploded perspective view showing a structure on a front face side of the card reader shown in FIG. 1.

FIG. 1 is a perspective view showing a card reader 1 in accordance with an embodiment of the present invention. FIG. 2 is an explanatory side view showing a schematic structure of the card reader 1 shown in FIG. 1. FIG. 3 is an explanatory exploded perspective view showing a structure on a front face side of the card reader 1 shown in FIG. 1.

The card reader 1 in this embodiment is a device in which at least one of reading of magnetic data recorded on a card 2 and recording of magnetic data to a card 2 is performed while the card 2 is moved by a user's manual operation. Specifically, the card reader 1 is a so-called dip type card reader in which reading and recording of magnetic data are performed when a card 2 is inserted into an inside of the card reader 1 or when a card 2 is pulled out from the card reader 1. For example, the card reader 1 is mounted and used in a predetermined host device such as an ATM.

As shown in FIGS. 1 and 2, the card reader 1 includes a magnetic head 3 for performing at least one of reading of magnetic data and recording of magnetic data, IC contacts 4 which are contacted with an IC chip fixed in a card 2 for performing exchanges of data, a pulling-out prevention lever 5 for preventing pulling out of an inserted card 2, a card insertion part 7 formed with an insertion port 6 into which a card 2 is inserted, and a main body frame 9 formed with a card passage 8 where a card 2 is passed.

In this embodiment, a card 2 is passed in an "X" direction as shown in FIG. 1 and the like. Specifically, a card 2 is inserted in an "X1" direction and the card 2 is pulled out in an "X2" direction. In other words, the "X1" direction is an inserting direction of a card 2 and the "X2" direction is a pulling-out direction of a card 2. Further, a "Z" direction in FIG. 1 and the like which is substantially perpendicular to the "X" direction is a thickness direction of a card 2 and a "Y" direction in FIG. 1 and the like which is substantially perpendicular to the "X" direction and the "Z" direction is a widthwise direction of a card 2 (short widthwise direction). In the following descriptions, an "X1" direction side is a "back (rear)" side, an "X2" direction side is a "front" side, a "Y1" direction side is a "right" side, a "Y2" direction side is a "left" side, a "Z1" direction side is an "upper" side, and a "Z2" direction side is a "lower" side.

Further, the card reader 1 includes a sensor 10 for detecting a card 2 which is inserted, a sensor 11 for detecting a rear end of the card 2 being reached to a rear end side of the card reader 1, an infrared sensor 12 for detecting a human body which detects movement of a person in front of the card reader 1, and a metal sensor 13 for detecting attachment of a foreign matter including metal material on the front face side of the card insertion part 7.

The card 2 is, for example, a rectangular card made of vinyl chloride whose thickness is about 0.7-0.8 mm. A magnetic stripe in which magnetic data are recorded is formed on a rear face (under face) of the card 2. Further, an IC chip is fixed on a front face of the card 2. In other words, the card 2 in this embodiment is a contact type IC card having a magnetic stripe. Further, an antenna for communication may be incorporated into the card 2. In other words, the card 2 may be a non-contact type IC card having a magnetic stripe. Further, the card 2 may be a PET (polyethylene terephthalate) card whose thickness is about 0.18-0.36 mm or may be a paper card having a predetermined thickness.

A front end side of the main body frame 9 is formed so that a front end side of a card 2 inserted into the card reader 1 can be held by a user. Specifically, the front end side of the main body frame 9 is formed so that its shape when viewed in the upper and lower direction is formed in a roughly "U"-shape. In other words, as shown in FIG. 3, the main body frame 9 is provided with two protruded parts 9a and 9b protruding toward the front side. In this embodiment, the protruded part 9a is disposed on the right side and the protruded part 9b is disposed on the left side. The card passage 8 is formed at an intermediate position of the main body frame 9 in the upper and lower direction. Further, the card passage 8 is formed in a substantially straight line shape from the front end to the rear end side of the main body frame 9. In other words, a part of the card passage 8 is also formed in the protruded parts 9a and 9b.

The card insertion part 7 is a housing which is formed so as to cover the front end side of the main body frame 9. The card insertion part 7 is formed of opaque resin material. Further, the card insertion part 7 is formed so that its shape when viewed in the upper and lower direction is formed in a roughly "U"-shape and is provided with two protruded parts 7a and 7b protruding toward the front side. In this embodiment, the protruded part 7a is disposed on the right side and covers the protruded part 9a of the main body frame 9. Further, the protruded part 7b is disposed on the left side and covers the protruded part 9b of the main body frame 9. The insertion port 6 is formed at an intermediate position of the card insertion part 7 in the upper and lower direction. Further, the insertion port 6 is formed so as to be along a front face of the card insertion part 7, which is structured of the front faces of the protruded parts 7a and 7b, the inner side faces of the protruded parts 7a and 7b in right and left direction, and a portion between the protruded parts 7a and 7b.

A front end of the protruded part 7a is formed with a protruded part 7c protruding toward the front side. The protruded part 7c is formed on an upper side with respect to the insertion port 6. Specifically, the protruded part 7c is formed just on an upper side of the insertion port 6. A lower side face of the protruded part 7c is, as shown in FIG. 2, formed to be inclined to an upper direction toward the front side. Further, a front end face of the protruded part 7a is formed with an opening part 7d penetrating in the front and rear direction. The opening part 7d is formed on a lower side with respect to the insertion port 6.

The magnetic head 3 is attached to the protruded part 9a of the main body frame 9. Specifically, the magnetic head 3 is, as shown in FIG. 2, disposed so that its gap part is exposed on the card passage 8 from a lower side and the magnetic head 3 is attached to a lower portion of the protruded part 9a with respect to the card passage 8. Further, the magnetic head 3 is disposed at a position so that the magnetic head 3 is capable of abutting with a magnetic stripe formed on the rear face of a card 2.

The IC contacts 4 are, as shown in FIG. 2, disposed on a rear end side of the card reader 1. Further, the IC contacts 4 are disposed on an upper side with respect to the card passage 8. The IC contacts 4 are fixed to an IC contact block 16. Lower end sides of lever members 17 are turnably attached to a front end side and a rear end side of the IC contact block 16 respectively. Upper end sides of the lever members 17 are turnably attached to the main body frame 9. Further, a rear end of a tension coil spring 18 is attached to a front end side of the IC contact block 16. A front end of the tension coil spring 18 is attached to the main body frame 9 and the IC contact block 16 is urged to the front side by the tension coil spring 18.

In this embodiment, when the rear end of a card 2 is abutted with a card abutting part 16a formed at a rear end of the IC contact block 16, the lever members 17 are turned with their upper end sides as a supporting point, and the IC contact block 16 is moved to a lower direction while moving to a rear direction. When the IC contact block 16 is moved to a lower direction while moving to a rear direction, the IC contacts 4 are contacted with an IC chip fixed on the surface of the card 2. Further, when the card 2 is pulled out in this state, the IC contact block 16 is moved to an upper direction while moving to the front direction by an urging force of the tension coil spring 18 and thus the IC contacts 4 are retreated from the card passage 8.

The pulling-out prevention lever 5 is connected with a solenoid. Further, the pulling-out prevention lever 5 is, as shown in FIG. 2, turnably attached to a fixed shaft 19 as a turning center. A front end of the pulling-out prevention lever 5 is formed with a closing part 5a for closing the card passage 8. The pulling-out prevention lever 5 is capable of turning with the fixed shaft 19 as a turning center and the front end side of the card passage 8 is closed as shown by the solid line in FIG. 2 or the card passage 8 is opened as shown by the two-dot chain line in FIG. 2.

In this embodiment, in a standby state that a card 2 is not inserted into the card reader 1, the closing part 5a of the pulling-out prevention lever 5 closes the card passage 8 as shown by the solid line in FIG. 2. More specifically, when the infrared sensor 12 does not detect movement of a person, the closing part 5a of the pulling-out prevention lever 5 closes the card passage 8 and thus a card 2 is unable to be inserted into the card reader 1.

In this state, when the infrared sensor 12 detects movement of a person, as shown by the two-dot chain line in FIG. 2, the pulling-out prevention lever 5 opens the card passage 8 to allow a card 2 to be inserted. Further, after the card 2 is inserted and, when the rear end of the card 2 is reached to the rear end side of the card reader 1, the closing part 5a closes the card passage 8. When the card passage 8 is closed by the closing part 5a, pulling out of the card 2 is prevented during reading and recording of data are performed between the IC contacts 4 and the IC chip. The pulling-out prevention lever 5 in this embodiment is a card insertion prevention member which closes the card passage 8 for preventing insertion of a card 2.

The sensor 10 is an optical type sensor provided with a light emitting element and a light receiving element and is disposed on a front end side of the card reader 1. In this embodiment, when a card 2 is inserted through the insertion port 6, a rear end of the card 2 is abutted with a card insertion detection lever 20 which is attached in the protruded part 9a (see FIG. 3). When the rear end of the card 2 is abutted with the card insertion detection lever 20, the card insertion detection lever 20 is moved to intercept between a light emitting element and a light receiving element of the sensor 10. When the card insertion detection lever 20 intercepts between the light emitting element and the light receiving element of the sensor 10, it is detected that a card 2 is inserted. In FIG. 2, the card insertion detection lever 20 is not shown.

The sensor 11 is, similarly to the sensor 10, an optical type sensor provided with a light emitting element and a light receiving element and is disposed on the rear end side of the card reader 1. In this embodiment, a rear end of a card 2 is abutted with the card abutting part 16a of the IC contact block 16 and then, when the IC contact block 16 is moved to a lower direction while moving to the rear direction, a light intercepting part 16b (see FIG. 2) of the IC contact block 16 intercepts between the light emitting element and the light receiving element of the sensor 11. When the light intercepting part 16b intercepts between the light emitting element and the light receiving element of the sensor 11, it is detected that the rear end of the card 2 is reached to the rear end of the card reader 1.

As described above, the sensor 10 and/or sensor 11 in this embodiment function as a detection sensor which detects presence/absence of a card 2 in the card passage 8.

The infrared sensor 12 is a pyroelectric type infrared sensor which is provided with a pyroelectric element detecting light including infrared rays by pyroelectric effect. The infrared sensor 12 detects movement of a person in front of the card reader 1 as described above. Specifically, the infrared sensor 12 detects movement of a human hand and the like in front of the card reader 1. Further, the infrared sensor 12 detects a difference between a body temperature of a person in front of the card reader 1 based on the infrared rays generated from the person in front of the card reader 1 and a temperature around the person in a detective range of the infrared sensor 12 and thereby movement of the person in front of the card reader 1 is detected. The infrared sensor 12 is disposed on the front face of the card insertion part 7. A detailed arrangement of the infrared sensor 12 will be described below.

The metal sensor 13 is a magnetic sensor in which variation of a magnetic field generated by excitation coils 22 and 23 described below is detected by a detection coil 24 described below to detect a metal member. The metal sensor 13 is disposed on the front face side of the card insertion part 7. A detailed structure of the metal sensor 13 and a detailed arrangement of the metal sensor 13 will be described below.

(Structure of Metal Sensor)

Figure 4:
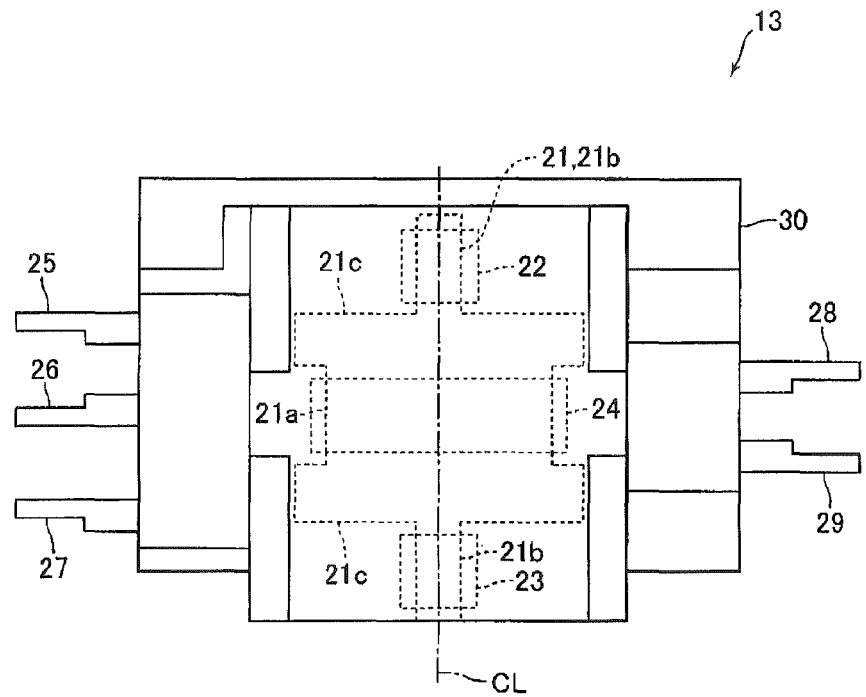
FIG. 4 is a front view showing a metal sensor in FIG. 2.
Figure 5:
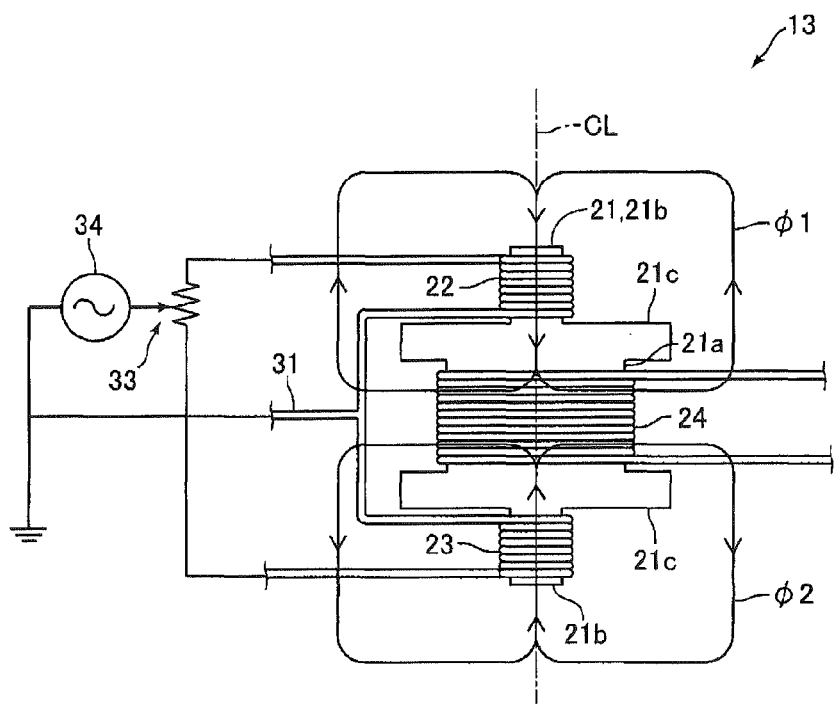
FIG. 5 is an explanatory view showing a structure of the metal sensor in FIG. 2.

FIG. 4 is a front view showing the metal sensor 13 in FIG. 2. FIG. 5 is an explanatory view showing a structure of the metal sensor 13 in FIG. 2.

The metal sensor 13 includes a core 21 formed of magnetic material, a pair of excitation coils 22 and 23 and a detection coil 24 which are wound around with a center axis "CL" of the core 21 as a center, terminals 25 through 27 to which end parts of the excitation coils 22 and 23 are connected, and terminals 28 and 29 to which end parts of the detection coil 24 are connected. The metal sensor 13 is formed by insert molding and the core 21, the excitation coils 22 and 23 and the detection coil 24 are disposed in an inside of a housing 30 formed of resin material having an insulation property. Further, one end sides of the terminals 25 through 29 are protruded from the housing 30.

The core 21 is formed in a thin plate shape whose thickness direction is a direction perpendicular to the paper surface in FIGS. 4 and 5. The core 21 is structured of a center core part 21a disposed at a substantially center in an axial direction of the center axis "CL", a pair of axial end core parts 21b and 21b respectively disposed on both end sides of the center core part 21a in the axial direction of the center axis "CL", an flange parts 21c which are disposed between the center core part 21a and the axial end core parts 21b. A width of the center core part 21a (width in the right and left direction in FIGS. 4 and 5) is wider than a width of the axial end core part 21b. In this embodiment, the width of the center core part 21a is about 1.5 times of the width of the axial end core part 21b. As described above, since the width of the center core part 21a is wider than the width of the axial end core part 21b, the magnetic field "$\phi 1$" and the magnetic field "$\phi 2$" are easily balanced. Further, a width of the flange part 21c is wider than the width of the center core part 21a.

Further, in this embodiment, the width of the center core part 21a is wider than the width of the axial end core part 21b. However, the width of the center core part 21a may be equal to the width of the axial end core part 21b. In other words, it is sufficient that the magnetic field "$\phi 1$" and the magnetic field "$\phi 2$" generated by the excitation coils 22 and 23 which are wound around the respective axis end core parts 21b are balanced.

The detection coil 24 is wound around the center core part 21a. One end part of the detection coil 24 is fixed to the terminal 28 and the other end part of the detection coil 24 is fixed to the terminal 29. The excitation coils 22 and 23 are wound around a pair of the axial end core parts 21b respectively. One end parts of the excitation coils 22 and 23 are fixed to the terminals 25 and 27. Further, the other end parts of the excitation coils 22 and 23 are fixed to one end part of a conducting wire 31. The other end part of the conducting wire 31 is fixed to the terminal 26. The terminals 25 and 27 are connected with an AC power supply 34 through a variable resistor 33 and the terminal 26 is grounded.

A detectable region "R1" (see FIG. 6) of the metal sensor 13 in this embodiment is a predetermined region with the center axis "CL" as a center and an axial direction of the center axis "CL" is a detecting direction of metal sensor 13. Further, in this embodiment, the excitation coils 22 and 23 are excited so that, when no metal member is existed in the detectable region "R1" of the metal sensor 13, a magnetic flux density of the magnetic field "$\phi 1$" (see FIG. 5) generated by the excitation coil 22 and a magnetic flux density of the magnetic field "$\phi 2$" (see FIG. 5) generated by the excitation coil 23 are set to be substantially the same as each other and, in addition, so that a direction of the magnetic field "$\phi 1$" and a direction of the magnetic field "$\phi 2$" are opposite to each other. In other words, in this embodiment, when no metal member is existed within the detectable region "R1" of the metal sensor 13, the variable resistor 33 is adjusted so that the magnetic field "$\phi 1$" and the magnetic field "$\phi 2$" are balanced. Therefore, when no metal member is existed within the detectable region "R1" of the metal sensor 13, no voltage is generated between both end parts of the detection coil 24.

On the other hand, when a metal member is disposed within the detectable region "R1" of the metal sensor 13, the balance between the magnetic field "$\phi 1$" and the magnetic field "$\phi 2$" is lost due to the metal member. When the balance between the magnetic field "$\phi 1$" and the magnetic field "$\phi 2$" is lost, a voltage is generated between both end parts of the detection coil 24. As described above, the metal sensor 13 in this embodiment detects the metal member by detecting the voltage generated between both end parts of the detection coil 24. In other words, the metal sensor 13 in this embodiment is a magnetic differential type metal sensor.

(Arrangement of Infrared Sensor and Arrangement of Metal Sensor)

Figure 6:
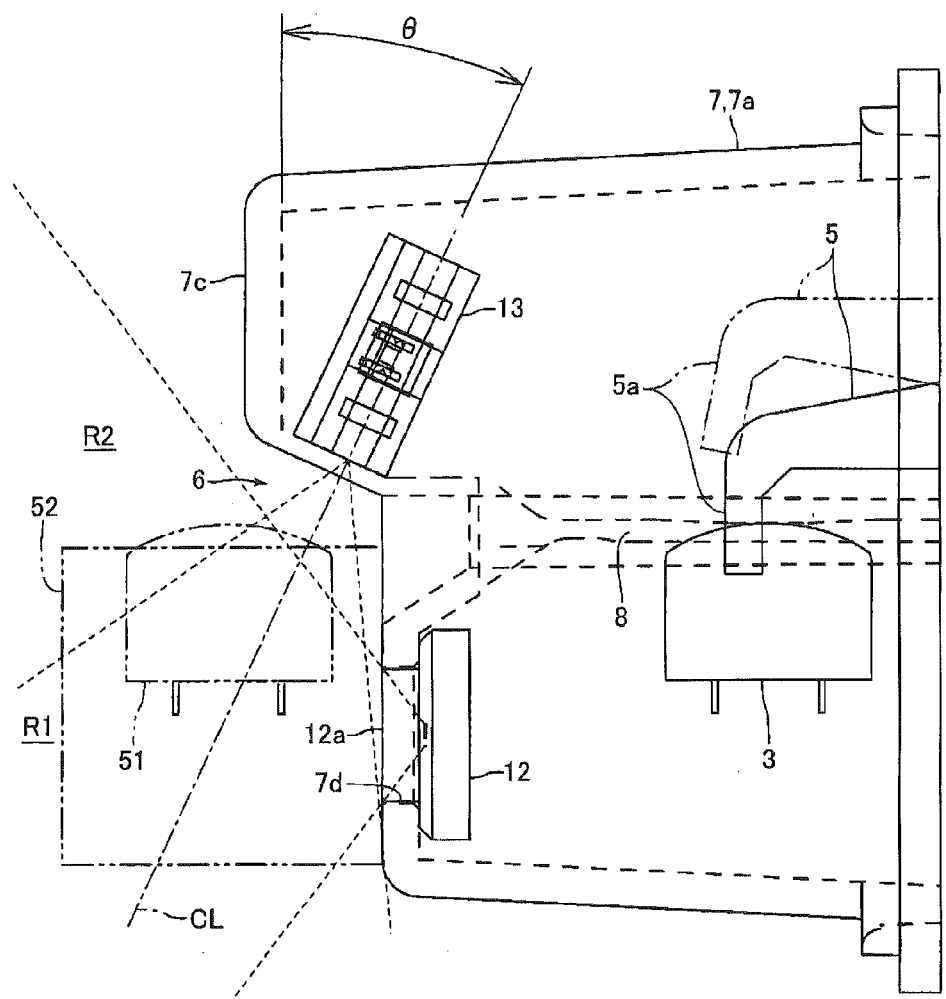
FIG. 6 is a side view for explaining arrangement of an infrared sensor and a metal sensor shown in FIG. 2.
Figure 6:
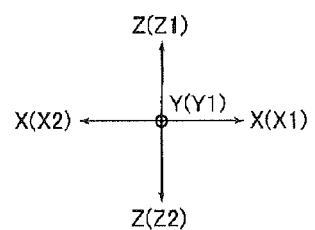
Figure 7:
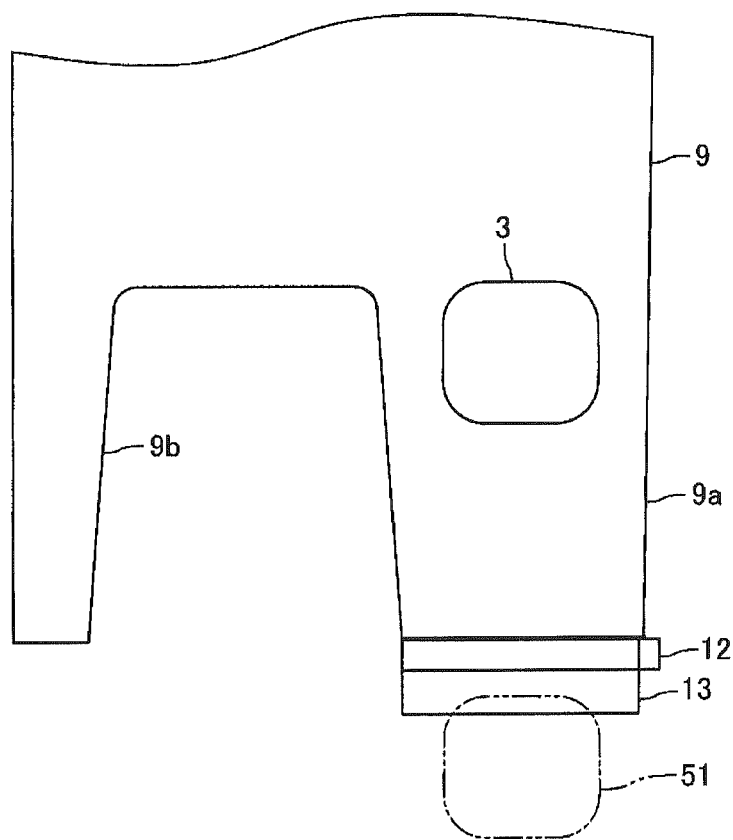
FIG. 7 is a plan view for explaining arrangement of the infrared sensor and the metal sensor shown in FIG. 2.
Figure 7:
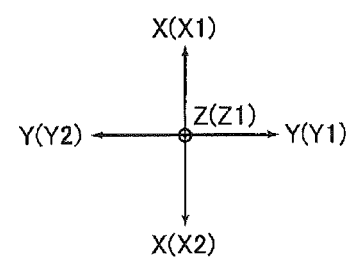

FIG. 6 is a side view for explaining arrangement of the infrared sensor 12 and the metal sensor 13 shown in FIG. 2. FIG. 7 is a plan view for explaining arrangement of the infrared sensor 12 and the metal sensor 13 shown in FIG. 2.

The infrared sensor 12 is disposed on the front face of the card insertion part 7 so that infrared rays generated from a user standing in front of the card reader 1 can be incident to the infrared sensor 12. Further, the infrared sensor 12 is disposed in the vicinity of the insertion port 6. Specifically, the infrared sensor 12 is disposed on the front face of the protruded part 9a of the main body frame 9 so that a light receiving part 12a of the infrared sensor 12 is disposed in an opening part 7d of the protruded part 7a. In other words, the infrared sensor 12 is disposed on a lower side with respect to the card passage 8.

Further, the infrared sensor 12 is, as shown in FIG. 7, disposed at a substantially the same position as the arrangement position of the magnetic head 3 in the right and left direction. In other words, the infrared sensor 12 is disposed at substantially the same position as the position of the magnetic stripe of a card 2 inserted into the card reader 1 in the right and left direction and thus the magnetic stripe of the card 2 inserted into the card reader 1 is passed through above the infrared sensor 12.

The metal sensor 13 is disposed on the front face side of the card insertion part 7 so as to be capable of detecting that a foreign matter including metal material is attached to the front face side with respect to the card insertion part 7. Further, the metal sensor 13 is disposed in the vicinity of the insertion port 6. Specifically, the metal sensor 13 is disposed on the front face of the protruded part 9a of the main body frame 9. Further, the metal sensor 13 is disposed in the inside of the protruded part 7c and is disposed on an upper side with respect to the card passage 8. In other words, when viewed in the front and rear direction, the magnetic head 3 and the metal sensor 13 are disposed so as to interpose the card passage 8 therebetween.

Further, the metal sensor 13 is, as shown in FIG. 7, disposed at substantially the same position as the arrangement position of the magnetic head 3 in the right and left direction. In other words, the metal sensor 13 is disposed at substantially the same position as the position of the magnetic stripe of a card 2 inserted into the card reader 1 in the right and left direction, and the magnetic stripe of the card 2 inserted into the card reader 1 is passed through on an under side of the metal sensor 13.

In addition, the metal sensor 13 is disposed so that its widthwise direction (right and left direction in FIGS. 4 and 5) is substantially coincided with the right and left direction ("Y" direction). Further, the metal sensor 13 is, as shown in FIG. 6, disposed so that the axial direction of the center axis "CL" which is the detecting direction is inclined with respect to the upper and lower direction and, in addition, so that the detectable region "R1" is widened toward the front side. In other words, the metal sensor 13 is disposed so as to be inclined to the rear side toward the upper side. The inclination angle "θ" of the axial direction of the center axis "CL" with respect to the upper and lower direction is, for example, 25°.

As described above, the infrared sensor 12 and the metal sensor 13 are disposed so as to interpose the card passage 8 therebetween when viewed in the front and rear direction. Further, in this embodiment, as shown in FIG. 6, the detectable region "R1" of the metal sensor 13 and the detectable region "R2" of the infrared sensor 12 are overlapped with each other.

(Schematic Operation of Card Reader)

In the card reader 1 structured as described above, during a standby time when a card 2 is not inserted, the pulling-out prevention lever 5 closes the card passage 8 to set in a state that a card 2 is unable to be inserted into the card reader 1. In this state, when the metal sensor 13 does not detect a metal member and the infrared sensor 12 detects movement of a person, the pulling-out prevention lever 5 opens the card passage 8 to set in a state that a card 2 is capable of being inserted. Further, after a card 2 is inserted by a user, when a rear end of the card 2 is reached to the rear end side of the card reader 1, the pulling-out prevention lever 5 closes the card passage 8. Further, when reading and recording of data are finished between the IC contacts 4 and the IC chip, the pulling-out prevention lever 5 opens the card passage 8 to set in a state that the card 2 is capable of being pulled out.

In this embodiment, as shown in FIG. 6, when a skimming device 52 provided with a skimming magnetic head 51 is attached in the detectable regions "R1" and "R2" on the front face side of the card insertion part 7 by a criminal, the skimming magnetic head 51 is provided with at least a metal member and thus the metal sensor 13 detects the skimming device 52. Further, all or a part of the light receiving part 12a of the infrared sensor 12 is intercepted by the skimming device 52.

In this embodiment, in a case that the metal sensor 13 has detected a metal member, even when the infrared sensor 12 detects movement of a person, the card passage 8 is maintained in a closed state by the pulling-out prevention lever 5. In other words, in this embodiment, in a case that the metal sensor 13 has detected a skimming device 52, even when the infrared sensor 12 detects movement of a person, the card passage 8 is maintained in a closed state by the pulling-out prevention lever 5 and insertion of a card 2 by a user is prevented. Further, in a case that the metal sensor 13 has detected a skimming device 52, the card reader 1 transmits an abnormal signal to a host device to notify occurrence of abnormality. In accordance with an embodiment of the present invention, the host device which receives the abnormal signal notifies a user occurrence of abnormality by performing a predetermined operation, for example, by indicating occurrence of abnormality on a display of the host device and/or by sounding a buzzer.

Further, even in a case that, although a skimming device 52 is attached, the metal sensor 13 is unable to detect the skimming device 52 because a certain artifice is made on the skimming device 52, all or a part of the light receiving part 12a is intercepted by the skimming device 52 and thus the infrared sensor 12 does not detect movement of a person, or the infrared sensor 12 is hard to detect movement of a person. Therefore, also in this case, as described above, the card passage 8 is maintained in the closed state by the pulling-out prevention lever 5 and insertion of a card 2 by a user is prevented.

In accordance with an embodiment of the present invention, it may be structured that, at a standby time when a card 2 is not inserted into the card reader 1, the excitation coils 22 and 23 are periodically excited so that the balance between the magnetic field "φ1" and the magnetic field "φ2" is lost (in other words, so as to periodically make the magnetic flux density of the magnetic field "φ1" differ from the magnetic flux density of the magnetic field "φ2") to check whether a voltage is generated between both end parts of the detection coil 24 or not. In this case, a periodical check is performed whether the metal sensor 13 appropriately detects a skimming device 52 or not. Therefore, when a skimming device 52 is attached, the skimming device 52 is surely detected by the metal sensor 13. Further, in a case that the above-mentioned check is performed, when a voltage is not generated between both end parts of the detection coil, for example, the card passage 8 is maintained in a closed state by the pulling-out prevention lever 5 in the card reader 1 and insertion of a card 2 by a user is prevented. Further, in this case, the card reader 1 transmits an abnormal signal to a host device and the host device which receives the abnormal signal performs a predetermined operation, for example, the host device indicates occurrence of abnormality on a display of the host device and/or sounds a buzzer.

Principal Effects in this Embodiment

As described above, in this embodiment, the card reader 1 includes the metal sensor 13 for detecting a foreign matter including metal material which is attached to a front face side with respect to the card insertion part 7. Further, in this embodiment, the metal sensor 13 is disposed at substantially the same position as the arrangement position of the magnetic head 3 in the right and left direction. The skimming magnetic head 51 is attached so as to correspond to the arrangement position of the magnetic head 3 in the right and left direction. Therefore, in this embodiment, it can be appropriately detected by the metal sensor 13 whether a skimming magnetic head 51 is attached or not. In other words, in this embodiment, it can be appropriately detected whether a skimming magnetic head 51 is attached or not with a relatively simple structure with the use of the metal sensor 13.

Especially, in this embodiment, the metal sensor 13 is disposed in the inside of the protruded part 7c which is disposed on an upper side with respect to the card passage 8 and, when viewed in the front and rear direction, the magnetic head 3 and the metal sensor 13 are disposed so as to interpose the card passage 8 therebetween. Further, the metal sensor 13 is disposed so that its detecting direction is inclined with respect to the upper and lower direction and so that its detectable region "R1" is widened toward the front side. The skimming magnetic head 51 is attached to the front face side with respect to the card insertion part 7 so as to superpose on the magnetic head 3 when viewed in the front and rear direction. Therefore, in this embodiment, it is further appropriately detectable whether a skimming magnetic head 51 is attached or not by the metal sensor 13.

Further, in this embodiment, when a skimming magnetic head 51 is attached to the front face of the card insertion part 7 and is detected by the metal sensor 13, the pulling-out prevention lever 5 maintains the state that the card passage 8 is closed to prevent insertion of a card 2 by a user. Therefore, in this embodiment, even when a skimming magnetic head 51 is attached to the front face of the card insertion part 7, since a user cannot insert a card 2, skimming itself is prevented.

Further, in this embodiment, the card reader 1 includes the infrared sensor 12 for detecting movement of a person in front of the card reader 1 and, when a skimming device 52 is attached to the front face of the card insertion part 7, all or a part of the light receiving part 12a of the infrared sensor 12 is intercepted by the skimming device 52. Further, in this embodiment, in a case that the infrared sensor 12 does not detect movement of a person, the pulling-out prevention lever 5 maintains the state that the card passage 8 is closed. Therefore, even in a case that, although a skimming device 52 is attached, the metal sensor 13 is unable to detect the skimming device 52 because a certain artifice is made on the skimming device 52, all or a part of the light receiving part 12a is intercepted by the skimming device 52 and thus the infrared sensor 12 does not detect movement of a person or the infrared sensor 12 is hard to detect movement of a person. Accordingly, also in this case, the card passage 8 is maintained in the closed state by the pulling-out prevention lever 5 and insertion of a card 2 by a user is prevented. Therefore, in this embodiment, even when a skimming device 52 is attached to the front face of the card insertion part 7, insertion of a card 2 is prevented and thus skimming itself is prevented.

In a case that a skimming device 52 is attached to the front face of the card insertion part 7, the infrared sensor 12 is unable to distinguish whether a skimming device 52 is attached to the front face of the card insertion part 7 or whether no person is existed in front of the card reader 1. In other words, when a skimming device 52 is attached to the front face of the card insertion part 7, the infrared sensor 12 cannot detect attachment of the skimming device 52. However, the card reader 1 in this embodiment includes the metal sensor 13 and thus, when a skimming device 52 is attached to the front face of the card insertion part 7, attachment of the skimming device 52 is detected by the metal sensor 13.

In this embodiment, the infrared sensor 12 and the metal sensor 13 are disposed so as to interpose the card passage 8 therebetween and the detectable region "R1" of the metal sensor 13 and the detectable region "R2" of the infrared sensor 12 are overlapped with each other. Therefore, the detectable regions "R1" and "R2" can be set in a portion where a skimming magnetic head 51 is easy to be attached. Accordingly, even in a case that a skimming device 52 having a skimming magnetic head 51 is relatively small, when the skimming device 52 is attached, the infrared sensor 12 is hard to detect movement of a person and the metal sensor 13 is easy to detect the skimming device 52. As a result, in this embodiment, an illegal act of a criminal is prevented further effectively by the infrared sensor 12 and the metal sensor 13.

In this embodiment, the metal sensor 13 is disposed in the inside of the protruded part 7c of the card insertion part 7 which is formed of opaque resin material. Therefore, a criminal is hard to notice that the metal sensor 13 is mounted. Further, the metal sensor 13 is easily prevented from being damaged by a criminal. In addition, a visual observation from an upper side of a criminal and a user is intercepted by the protruded part 7c and thus the infrared sensor 12 is hard to be found.

In this embodiment, the detection coil 24 is wound around the center core part 21a disposed at a substantially center in the axial direction of the center axis "CL", and a pair of the excitation coils 22 and 23 are respectively wound around a pair of the axial end core parts 21b which are disposed on both end sides of the center core part 21a in the axial direction of the center axis "CL", and the metal sensor 13 detects a foreign matter based on a balance between the magnetic field "φ1" generated by the excitation coil 22 and the magnetic field "φ2" generated by the excitation coil 23. Therefore, in this embodiment, for example, as described in Japanese Patent Laid-Open No. 2003-255053, a foreign matter including metal material can be detected with a high degree of sensitivity and can be stably detected while effect of variation of a surrounding temperature is restrained.

Principal Effects in this Embodiment

As described above, in this embodiment, the card reader 1 includes the metal sensor 13 for detecting a foreign matter including metal material which is attached to a front face side with respect to the card insertion part 7. Further, in this embodiment, when a skimming device 52 is attached to the front face of the card insertion part 7 and is detected by the metal sensor 13, the pulling-out prevention lever 5 maintains the state that the card passage 8 is closed to prevent insertion of a card 2 by a user. Therefore, in this embodiment, even when a skimming device 52 is attached to the front face of the card insertion part 7, since a user cannot insert a card 2, skimming itself is prevented.

Further, in this embodiment, the card reader 1 includes the infrared sensor 12 for detecting movement of a person in front of the card reader 1 and, when a skimming device 52 is attached to the front face of the card insertion part 7, all or a part of the light receiving part 12a of the infrared sensor 12 is intercepted by the skimming device 52. Further, in this embodiment, in a case that the infrared sensor 12 does not detect movement of a person, the card passage 8 is maintained in a closed state by the pulling-out prevention lever 5. Therefore, even in a case that, although a skimming device 52 is attached, the metal sensor 13 is unable to detect the skimming device 52 because a certain artifice is made on the skimming device 52, all or a part of the light receiving part 12a is intercepted by the skimming device 52 and thus the infrared sensor 12 does not detect movement of a person or the infrared sensor 12 is hard to detect movement of a person. Accordingly, also in this case, the card passage 8 is maintained in the closed state by the pulling-out prevention lever 5 and insertion of a card 2 by a user is prevented. Therefore, in this embodiment, even when a skimming device 52 is attached to the front face of the card insertion part 7, insertion of a card 2 is prevented and thus skimming itself is prevented. As described above, in this embodiment, skimming itself can be prevented with a relatively simple structure with the use of the infrared sensor 12 and an illegal act of a criminal is prevented.

In a case that a skimming device 52 is attached to the front face of the card insertion part 7, the infrared sensor 12 is unable to distinguish whether a skimming device 52 is attached to the front face of the card insertion part 7 or whether no person is existed in front of the card reader 1. In other words, when a skimming device 52 is attached to the front face of the card insertion part 7, the infrared sensor 12 cannot detect attachment of the skimming device 52. However, the card reader 1 in this embodiment includes the metal sensor 13 and thus, when a skimming device 52 is attached to the front face of the card insertion part 7, attachment of the skimming device 52 is detected by the metal sensor 13.

In this embodiment, the infrared sensor 12 is disposed in the vicinity of the insertion port 6. Therefore, when a skimming device 52 is attached to the front face of the card insertion part 7, the light receiving part 12a of the infrared sensor 12 is easy to be intercepted by the skimming device 52. Especially, in this embodiment, the magnetic head 3 is disposed on a lower side with respect to the card passage 8 and the infrared sensor 12 is disposed on a lower side with respect to the card passage 8. Further, the infrared sensor 12 is disposed at substantially the same position as the arrangement position of the magnetic head 3 in the right and left direction. A skimming magnetic head 51 is attached so as to correspond to the arrangement position of the magnetic head 3 in the upper and lower direction and in the right and left direction. Therefore, in this embodiment, when a skimming device 52 is attached to the front face of the card insertion part 7, the light receiving part 12*a* of the infrared sensor 12 is easy to be intercepted further surely by the skimming magnetic head 51. Accordingly, when a skimming device 52 is attached to the front face of the card insertion part 7, the infrared sensor 12 is further hard to detect movement of a person in front of the card reader 1. As a result, insertion of a card 2 is prevented and skimming itself is prevented further surely.

In this embodiment, the detectable region "R1" of the metal sensor 13 and the detectable region "R2" of the infrared sensor 12 are overlapped with each other. Therefore, the detectable regions "R1" and "R2" can be set in a portion where a skimming magnetic head 51 is easy to be attached. Therefore, even in a case that a skimming device 52 having a skimming magnetic head 51 is relatively small, when the skimming device 52 is attached, the infrared sensor 12 is hard to detect movement of a person and the metal sensor 13 is easy to detect the skimming device 52. As a result, in this embodiment, an illegal act of a criminal is prevented further effectively by the infrared sensor 12 and the metal sensor 13.

First Modified Example of Operation of Card Reader when Skimming Device is Attached In the embodiment described above, during a standby time when a card 2 is not inserted, the pulling-out prevention lever 5 closes the card passage 8. However, during a standby time when a card 2 is not inserted, the pulling-out prevention lever 5 may be located at a position so that the card passage 8 is opened. In this case, a skimming device 52 is attached to the card insertion part 7 and, when the metal sensor 13 detects the skimming device 52, the pulling-out prevention lever 5 closes the card passage 8 to prevent insertion of a card 2 by a user.

Second Modified Example of Operation of Card Reader when Skimming Device is Attached In the embodiment described above, the pulling-out prevention lever 5 maintains the state that the card passage 8 is closed to prevent insertion of a card 2 by a user and thereby skimming itself is prevented. However, it may be structured that a disturbing noise is generated by the metal sensor 13 for disturbing reading of magnetic data on a card 2 by the skimming magnetic head 51 to prevent skimming itself.

For example, it may be structured that, when the metal sensor 13 detects a skimming device 52, a disturbing noise is generated by the metal sensor 13 for disturbing reading of magnetic data on a card 2 by the skimming magnetic head 51. According to this structure, in a case that, although the metal sensor 13 detects a skimming device 52, the pulling-out prevention lever 5 has been damaged by a criminal so that a card 2 is capable of being inserted by a user or, even in a case that, although the metal sensor 13 detects a skimming device 52, since the card reader 1 does not include the pulling-out prevention lever 5, a card 2 is capable of being inserted by a user, reading of magnetic data by the skimming magnetic head 51 is prevented and skimming itself is prevented. In this case, a pair of the excitation coils 22 and 23 is respectively excited so that a balance between the magnetic field "φ1" and the magnetic field "φ2" is largely lost to generate a disturbing noise. Specifically, in this case, the variable resistor 33 is adjusted so that a balance between the magnetic field "φ1" and the magnetic field "φ2" are largely lost. As a result, a difference of magnetic flux density is occurred between the magnetic field "φ1" and the magnetic field "φ2" and a magnetic field occurred by the obtained difference of the magnetic flux density is applied as a disturbing noise. Alternatively, a disturbing noise may be generated by the detection coil 24. Specifically, a voltage is applied to the detection coil 24 to generate a magnetic field, which is applied as a disturbing noise. In this case, a constant frequency which is approximate to a normal output of magnetic data recorded on a card 2 is inputted, illegal reading of magnetic data by the skimming magnetic head 51 of the skimming device 52 can be disturbed effectively. Further, it may be structured that a voltage is applied to one of a pair of the excitation coils 22 and 23 to occur a magnetic field for generating a disturbing noise so that the disturbing noise is generated toward a skimming device 52.

Further, for example, it may be structured that, when movement of a person is not detected by the infrared sensor 12, a disturbing noise is always generated by the metal sensor 13 and, when movement of a person is detected by the infrared sensor 12, the disturbing noise by the metal sensor 13 is stopped. According to this structure, in a case that, although a skimming device 52 is attached to the card insertion part 7 and thus the light receiving part 12*a* of the infrared sensor 12 is intercepted, the pulling-out prevention lever 5 is damaged by a criminal so that a card 2 is capable of being inserted by a user or, even in a case that, although the light receiving part 12*a* of the infrared sensor 12 is intercepted, since the card reader 1 does not include the pulling-out prevention lever 5, a card 2 is capable of being inserted by a user, when the light receiving part 12*a* of the infrared sensor 12 is intercepted by the skimming device 52, the metal sensor 13 generates a disturbing noise. Therefore, reading of magnetic data on a card 2 by the skimming magnetic head 51 is prevented and skimming itself is prevented.

In accordance with an embodiment of the present invention, in these cases described above, the metal sensor 13 may generate a disturbing noise by which reading of magnetic data on a card 2 by the magnetic head 3 is prevented. In this case, since magnetic data on a card 2 cannot be read by the magnetic head 3 appropriately, the succeeding transaction in the card reader 1 is stopped. Therefore, for example, a personal identification number of a card 2 is prevented from being acquired by a criminal.

In addition, even in a case that the metal sensor 13 does not detect a skimming device 52, for example, a disturbing noise may be generated when a card 2 is inserted into the card reader 1 or when a card 2 is pulled out from the card reader 1. Specifically, as an example, the metal sensor 13 generates a disturbing noise in response to a time when the card reader 1 obtains output information which detects insertion of a card 2 into the card reader 1 (for example, when the card reader 1 obtains reading output of magnetic data from the magnetic head 3 for reading magnetic data of an inserted card 2, information from the card sensor 10 which detects insertion of a card 2 is obtained, or the like). In this case, the metal sensor 13 generates a disturbing noise in a level which does not affect reading of magnetic data by the magnetic head 3. According to this structure, reading of magnetic data by the skimming magnetic head 51 of the skimming device 52 is prevented without affecting reading of magnetic data by the magnetic head 3 and thus skimming itself can be prevented. For example, in a state that a skimming device 52 is attached, even when magnetic data on a card 2 are illegally read by several percent (%) by the skimming magnetic head 51 after a card 2 is beginning to be inserted until insertion of a card is detected and its output information is obtained, a disturbing noise is generated in response to the detection of a card 2 in the card reader 1. Therefore, reading of magnetic data by the skimming magnetic head 51 is prevented.

Third Modified Example of Operation of Card Reader when Skimming Device is Attached In the embodiment described above, in a case that the metal sensor 13 detects a skimming device 52, the pulling-out prevention lever 5 maintains the state that the card passage 8 is closed and insertion of a card 2 by a user is prevented. However, the present invention is not limited to this embodiment. For example, in a case that a skimming device 52 is attached to the card insertion part 7 and the metal sensor 13 detects the skimming device 52, the card reader 1 may transmit an abnormal signal to its host device. According to this structure, in a case that, although the metal sensor 13 detects a skimming device 52, the pulling-out prevention lever 5 is damaged by a criminal so that a card 2 is capable of being inserted by a user or, even in a case that, although the metal sensor 13 detects a skimming device 52, since the card reader 1 does not include the pulling-out prevention lever 5, a card 2 is capable of being inserted by a user, the succeeding transaction in the card reader 1 is stopped on the basis of a control command from its host device. Therefore, for example, a personal identification number of a card 2 is prevented from being acquired by a criminal.

Further, although the infrared sensor 12 does not detect movement of a person, when the sensor 10 and/or the sensor 11 detect a card 2, the card reader 1 may transmit an abnormal signal to its host device. Although the infrared sensor 12 does not detect movement of a person, in a case that the sensor 10 and/or the sensor 11 detect a card 2, it may be judged that a skimming device 52 is attached to the card insertion part 7. Therefore, according to this structure, in a case that, although the light receiving part 12a of the infrared sensor 12 is intercepted, the pulling-out prevention lever 5 is damaged by a criminal so that a card 2 is capable of being inserted by a user or, even in a case that, although the light receiving part 12a of the infrared sensor 12 is intercepted, since the card reader 1 does not include the pulling-out prevention lever 5, a card 2 is capable of being inserted by a user, the succeeding transaction in the card reader 1 is stopped on the basis of a control command from its host device. As a result, for example, a personal identification number of a card 2 is prevented from being acquired by a criminal.

Fourth Modified Example of Operation of Card Reader when Skimming Device is Attached In the embodiment described above, in a case that the metal sensor 13 detects a metal member, even when the infrared sensor 12 detects movement of a person, the pulling-out prevention lever 5 maintains the state that the card passage 8 is closed. However, the present invention is not limited to this embodiment. For example, even in a case that the metal sensor 13 detects a metal member, when the infrared sensor 12 detects movement of a person, the pulling-out prevention lever 5 may be moved so that the card passage 8 is opened. According to this structure, although a skimming device 52 is not attached to the front face of the card insertion part 7, in a case that the metal sensor 13 detects a finger ring, a watch or the like of a user, reading and recording of magnetic data on a card 2 are performed in the card reader 1. In other words, when the card reader 1 includes the infrared sensor 12, even when an erroneous detection is occurred by the metal sensor 13, reading and recording of magnetic data on a card 2 is performed in the card reader 1.

Other Embodiments

Although the present invention has been shown and described with reference to a preferred embodiment and a modified embodiment, various changes and modifications will be apparent to those skilled in the art from the teachings herein.

In the embodiment described above, the card reader 1 includes the infrared sensor 12. However, the card reader 1 may include no infrared sensor 12. Also in this case, when the metal sensor 13 detects a skimming device 52, the pulling-out prevention lever 5 maintains the state that the card passage 8 is closed and thereby insertion of a card 2 by a user is prevented and skimming itself is prevented. Further, also in this case, when the metal sensor 13 detects a skimming device 52, a disturbing noise is generated by the metal sensor 13 and thereby skimming itself can be prevented. Alternatively, also in this case, when the metal sensor 13 detects a skimming device 52, the card reader 1 transmits an abnormal signal to its host device and thereby the succeeding transaction in the card reader 1 is stopped according to a control command from its host device and, as a result, for example, a personal identification number of a card 2 is prevented from being acquired by a criminal.

In the embodiment described above, the protruded part 7c is formed in the card insertion part 7. However, the card insertion part 7 may be formed with no protruded part 7c. In this case, for example, the metal sensor 13 is disposed on the front end side in the inside of the protruded part 7a. Further, in the embodiment described above, the metal sensor 13 is disposed so that the axial direction of the center axis "CL" is inclined with respect to the upper and lower direction. However, the metal sensor 13 may be disposed so that the axial direction of the center axis CL is substantially parallel to the upper and lower direction.

In the embodiment described above, the metal sensor 13 is disposed on the upper side with respect to the card passage 8. However, the metal sensor 13 may be disposed on a lower side with respect to the card passage 8. In this case, for example, the metal sensor 13 is disposed so that the axial direction of the center axis "CL" is substantially parallel to the front and rear direction. Further, in the embodiment described above, the infrared sensor 12 is disposed on the lower side with respect to the card passage 8. However, the infrared sensor 12 may be disposed on an upper side with respect to the card passage 8. Further, in the embodiment described above, the infrared sensor 12 is disposed at substantially the same position as the arrangement position of the magnetic head 3 in the right and left direction. However, the arrangement position of the infrared sensor 12 and the arrangement position of the magnetic head 3 may be displaced from each other in the right and left direction.

In the embodiment described above, the metal sensor 13 is structured of the core 21, a pair of the excitation coils 22 and 23, and the detection coil 24. However, the metal sensor 13 may be structured of a core and a coil for excitation and detection which is wound around the core.

In the embodiment described above, the card reader 1 includes the metal sensor 13. However, the card reader 1 may include no metal sensor 13. Also in this case, when all or a part of the light receiving part 12a of the infrared sensor 12 is intercepted by the skimming device 52 and thereby the infrared sensor 12 does not detect movement of a person, the card passage 8 is maintained in a closed state by the pulling-out prevention lever 5. Accordingly, also in this case, the card passage 8 is maintained in the closed state by the pulling-out prevention lever 5 and insertion of a card 2 by a user is prevented and thus skimming itself is prevented.

Further, also in this case, when movement of a person is not detected by the infrared sensor 12, a disturbing noise is always generated by the metal sensor 13 and, when movement of a person is detected by the infrared sensor 12, the disturbing noise by the metal sensor 13 is stopped and, as a result, skimming itself is prevented. Alternatively, also in this case, although the infrared sensor 12 does not detect movement of a person, when the sensor 10 and/or the sensor 11 detect a card 2, the card reader 1 transmits an abnormal signal to its host device and thereby the succeeding transaction in the card reader 1 can be stopped according to a control command from its host device and, as a result, for example, a personal identification number of a card 2 is prevented from being acquired by a criminal.

In the embodiment described above, the card reader 1 includes one infrared sensor 12. However, the card reader 1 may include two or more infrared sensors 12. In this case, for example, when at least one of the infrared sensors 12 does not detect movement of a person, it is judged that a skimming device 52 is attached and thus the pulling-out prevention lever 5 maintains the state that the card passage 8 is closed.

In the embodiment described above, the card reader 1 includes the pulling-out prevention lever 5 as a card insertion prevention member for closing the card passage 8 to prevent insertion of a card 2. However, the present invention is not limited to this embodiment. For example, the card reader 1 may include a shutter member formed in a flat plate shape or a bar shape which is capable of closing the front end side of the card passage 8 as a card insertion prevention member which is capable of closing the card passage 8 to prevent insertion of a card 2. Further, the card reader 1 may include no card insertion prevention member. Further, in the embodiment described above, the card reader 1 includes the IC contacts 4. However, the card reader 1 may include no IC contact 4.

In the embodiment described above, the card reader 1 is a dip type card reader in which reading and recording of magnetic data are performed when a card 2 is manually moved by a user. However, a card reader to which the structure of the present invention is applied may be a card feeding type card reader provided with a feeding mechanism for a card.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card configured to record magnetic data, the card reader comprising:
   a magnetic head configured to read magnetic data recorded on the card or record magnetic data to the card;
   a card insertion part comprising an insertion port into which the card is inserted;
   a metal sensor configured to detect attachment of a foreign matter including metal material to a front face side of the card insertion part;
   a card passage where the card is passed; and
   a protruded part which is formed in the card insertion part so that an opposite side to a side where the magnetic head is disposed with respect to the card passage is protruded to a front side from a front face of the card insertion part;
   wherein, when viewed in an inserting direction of the card, the protruded part and the magnetic head are disposed so as to interpose the card passage therebetween;
   wherein the metal sensor is disposed at substantially a same position as an arrangement position of the magnetic head in a widthwise direction of the card which is substantially perpendicular to an inserting direction of the card; and
   wherein the metal sensor is disposed in an inside of the protruded part which is protruded to the front side from the front face of the card insertion part on the side where the magnetic head is disposed.

2. The card reader according to claim 1, wherein the metal sensor is disposed so that its detecting direction is inclined with respect to a thickness direction of the card that is substantially perpendicular to the inserting direction of the card and the widthwise direction of the card, and so that its detectable region is widened to the front side from the front face of the card insertion part on the side where the magnetic head is disposed with respect to the card passage.

3. The card reader according to claim 1, wherein
   the metal sensor comprises a core which is formed of magnetic material and a pair of excitation coils and a detection coil which are wound around the core with a center axis of the core as a center,
   the core is provided with a center core part which is disposed at a substantially center in an axial direction of the center axis and a pair of axial end core parts which are disposed on both end sides of the center core part in the axial direction of the center axis, and
   the detection coil is wound around the center core part and each of the pair of the excitation coils is wound around each of the pair of the axial end core parts.

4. The card reader according to claim 3, wherein at least one coil of the pair of the excitation coils and the detection coil is excited so that a disturbing noise is generated for disturbing reading of magnetic data on the card by a skimming magnetic head which is the foreign matter attached to the front face side with respect to the card insertion part.

5. The card reader according to claim 1, further comprising a card insertion prevention member configured to close the card passage to prevent insertion of the card, wherein, when the metal sensor detects the foreign matter, the card insertion prevention member maintains a state that the card passage is closed, or the card insertion prevention member closes the card passage having been opened.

6. The card reader according to claim 1, further comprising an infrared sensor configured to detect a human body which is disposed on the front face side of the card insertion part and configured to detect movement of a person on a front side with respect to the card reader.

7. The card reader according to claim 6, wherein, when viewed in the inserting direction of the card, the metal sensor and the infrared sensor are disposed so as to interpose the card passage therebetween.

8. The card reader according to claim 6, wherein at least a part of a detectable region of the metal sensor and at least a part of a detectable region of the infrared sensor are overlapped with each other.

9. The card reader according to claim 1, wherein
the magnetic head is disposed on a lower side with respect to the card passage,
an upper side of the card insertion part with respect to the card passage is protruded to the front side from the front face of the card insertion part on the side where the magnetic head is disposed to form the protruded part, and
the metal sensor which is disposed in the inside of the protruded part is disposed so that its detecting direction is widened to a lower side of the protruded part and to the front side with respect to the front face of the card insertion part on the side where the magnetic head is disposed.

10. The card reader according to claim 9, wherein the metal sensor is disposed in the inside of the protruded part so that its detecting direction is widened to the lower side of the protruded part from a position on a front side with respect to the front face of the card insertion part on the side where the magnetic head is disposed.

11. The card reader according to claim 9, further comprising an infrared sensor for detecting a human body which is disposed on a front face side of the card insertion part on the side where the magnetic head is disposed for detecting movement of a person on a front side with respect to the card reader.

12. A card reader for use with a card configured to record magnetic data, the card reader comprising:
a magnetic head configured to read magnetic data recorded on the card or record magnetic data to the card;
a card insertion part comprising an insertion port into which the card is inserted;
an infrared sensor configured to detect a human body which is disposed on a front face side of the card insertion part and configured to detect movement of a person in front of the card reader;
a card passage where the card is passed; and
a card sensor for detecting presence/absence of the card in the card passage;
wherein the infrared sensor is disposed at substantially a same position as an arrangement position of the magnetic head in a widthwise direction of the card which is substantially perpendicular to an inserting direction of the card;
wherein the magnetic head is disposed so that its gap part faces the card passage,
wherein the infrared sensor is disposed on a side where the magnetic head is disposed with respect to the card passage in a thickness direction of the card which is substantially perpendicular to an inserting direction of the card and which is substantially perpendicular to a widthwise direction of the card that is substantially perpendicular to the inserting direction of the card, and
wherein, when the card sensor detects the card in a state that the infrared sensor does not detect movement of a person, an abnormal signal is transmitted to a host device on which the card reader is mounted.

13. The card reader according to claim 12, wherein the infrared sensor is disposed in a vicinity of the insertion port.

14. The card reader according to claim 12, further comprising
a card passage where the card is passed, and
a card insertion prevention member configured to close the card passage to prevent insertion of the card,
wherein the card insertion prevention member closes the card passage at a standby time when the card is not inserted into the card reader and, when the infrared sensor detects movement of a person, the card insertion prevention member opens the card passage to permit insertion of the card.

15. The card reader according to claim 12, further comprising a metal sensor which is disposed on a front face side of the card insertion part and configured to detect attachment of a foreign matter including metal material to a front face side with respect to the card insertion part.

16. The card reader according to claim 15, wherein
the metal sensor comprises a core which is formed of magnetic material and a pair of excitation coils and a detection coil which are wound around the core with a center axis of the core as a center,
the core is provided with a center core part which is disposed at a substantially center in an axial direction of the center axis and a pair of axial end core parts which are disposed on both end sides of the center core part in the axial direction of the center axis,
the detection coil is wound around the center core part and each of the pair of the excitation coils is wound around each of the pair of the axial end core parts, and at least one coil of the pair of the excitation coils and the detection coil is excited so that, when the infrared sensor does not detect movement of a person, a disturbing noise is generated for disturbing reading of magnetic data on the card by a skimming magnetic head which is the foreign matter attached to the front face side with respect to the card insertion part, and so that the disturbing noise is stopped when the infrared sensor detects movement of a person.

17. The card reader according to claim 15, wherein at least a part of a detectable region of the infrared sensor and at least a part of a detectable region of the metal sensor are overlapped with each other.

18. A card reader for use with a card configured to record magnetic data, the card reader comprising:
a magnetic head configured to read magnetic data recorded on the card or record magnetic data to the card;
a card insertion part comprising an insertion port into which the card is inserted; and
a metal sensor configured to detect attachment of a foreign matter including metal material to a front face side of the card insertion part;
wherein the metal sensor comprises a core which is formed of magnetic material, and a pair of excitation coils and a detection coil which are wound around with a center axis of the core as a center;
wherein the core is provided with a center core part which is disposed at a substantially center in an axial direction of the center axis and a pair of axial end core parts which are disposed on both end sides of the center core part in the axial direction of the center axis, and the detection coil is wound around the center core part and each of the pair of the excitation coils is wound around each of the pair of the axial end core parts; and
wherein the metal sensor is disposed at substantially a same position as an arrangement position of the magnetic head in a widthwise direction of the card which is substantially perpendicular to an inserting direction of the card.

* * * * *